United States Patent [19]
Baratta

[11] 3,785,343
[45] Jan. 15, 1974

[54] BIRD CAGE

[75] Inventor: Hilda E. Baratta, Hyde Park, N.Y.

[73] Assignee: The Raymond Lee Organization, Inc., New York, N.Y. ; a part interest

[22] Filed: Oct. 19, 1972

[21] Appl. No.: 298,927

[52] U.S. Cl. ............................................... 119/17
[51] Int. Cl. ........................................... A01k 31/04
[58] Field of Search .......................... 119/17, 18, 23

[56] References Cited
UNITED STATES PATENTS

| | | | |
|---|---|---|---|
| 2,914,022 | 11/1959 | Hinton | 119/17 |
| 1,632,380 | 6/1927 | Marcus | 119/17 |
| 2,112,940 | 4/1938 | Voss | 119/17 |
| 3,415,226 | 12/1968 | Cheung | 119/18 |
| 3,185,133 | 5/1965 | Bird | 119/18 |

Primary Examiner—Louis G. Mancene
Assistant Examiner—J. N. Eskovitz
Attorney—Howard I. Podell

[57] ABSTRACT

An improved bird cage, fabricated of transparent plastic material which provides separate connecting compartments for sleeping and bathing purposes of the caged bird. The sides and top of the bathing compartment and the sleeping compartment are formed of solid transparent plastic sheets, with each compartment being removable from the cage assembly, and with the openings in the main cage compartment to the bathing and sleeping compartments being closeable by a sliding door or grill. The base section of the cage is removable for cleaning purposes, and is located below a grill of plastic bars which may be fastened to, or removed from the cage independently of the removable base section.

1 Claim, 5 Drawing Figures

PATENTED JAN 15 1974 3,785,343

BIRD CAGE

SUMMARY OF THE INVENTION

This invention relates to a bird cage with separate removable side compartments, said removable compartments being provided for sleeping and bathing purposes respectively.

An advantage of this bird cage is that the separate detachable bathing and sleeping compartments may be enclosed by solid transparent plastic panels.

A further advantage of this bird cage is that it may be constructed of transparent plastic material throughout, to reduce the possibility of the bird, in a frightened condition, injuring itself against metal bars conventionally employed to construct such cages.

The exterior sides and top of the main cage compartment are formed of a plastic grill. Openings in opposing sides lead to the solid panelled sleeping compartment and bathing compartment respectively, with either or both of such openings closeable, as desired, by the use of sliding plastic grill doors mounted to the main compartment. The sleeping compartment contains a concave-shaped platform to permit the bird nestle upon, and the bottom of the bathing compartment forms a concave water-proof tub.

The base section of the main compartment is removable for cleaning purposes, being covered by a slidable plastic grill which is removed or replaced independently of the base section, so as to enclose the bottom section of the cage, when the base section is removed.

The main cage compartment is fitted with removable feed and water compartments which attach to a side of the cage, with a grill which slides in the vertical plane to cover the cage opening in the down position, and a handle member mounted on the top of the cage which is attachable to a pedestal stand. The handle member is also suitable for manually carrying the cage, when it is detached from said pedestal stand.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
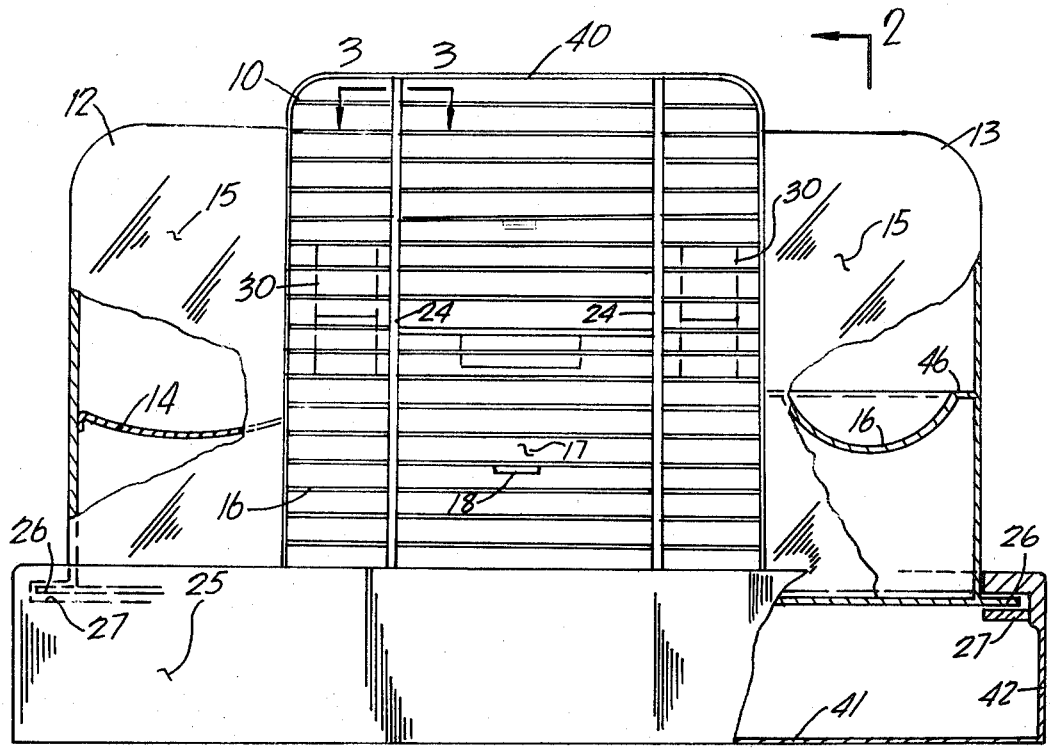
FIG. 1 is an elevation view of the improved bird cage.

Turning now descriptively to the drawings, in which similar reference characters denote similar elements throughout the several views, FIG. 1-5 illustrate the bird cage 10 with independently removable sleeping compartment 12, bathing compartment 13, base section 25, and feed and water compartments 30.

The central compartment 40 is formed of plastic grill work consisting of spaced horizontal transparent or translucent plastic bars which are joined together. Vertical angle sections 24 border the main cage opening and the openings from the central compartment 40 to the bathing compartment 13 and the sleeping compartment 12. Angle sections 24 extend considerably above the said openings in the cage grill to provide a track for the sliding, in a vertical plane, of the cage door 17 and for each of the two doors 22 which enclose the sleeping and bathing compartment. A pair of similarly shaped angle members are horizontally mounted to the opposing sides of the bottom cage opening to retain the bottom grill 20 in place, permitting the bottom grill 20 to be slid out of the back of the cage, independently of the position of the bottom base section 25. The bottom base section 25, consisting of a solid bottom panel 41 joined to four solid side panels 42, is hung from projections 26 extending horizontally from the bottom of the two opposing cage sides, with projections 26 fitting into horizontal grooves formed by projections 27 which extend from the interior of the sides 42, so as to permit the bottom base section 25 to be slid in the horizontal plane out of engagement with the cage projections 26, when it is desired to remove the bottom base section 25 for purposes of cleaning.

Figures 3, 5:
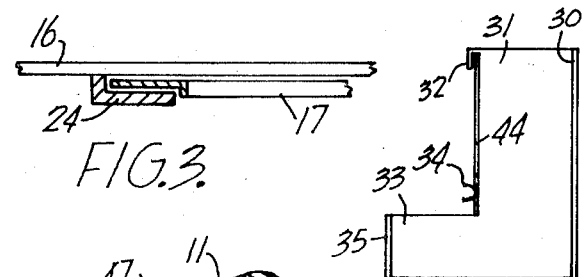
FIG. 3 is a fragmentary sectional view of the door grill and attaching slide member taken along line 3—3.
FIG. 5 is a side sectional view of a feeding tray.
Figure 4:
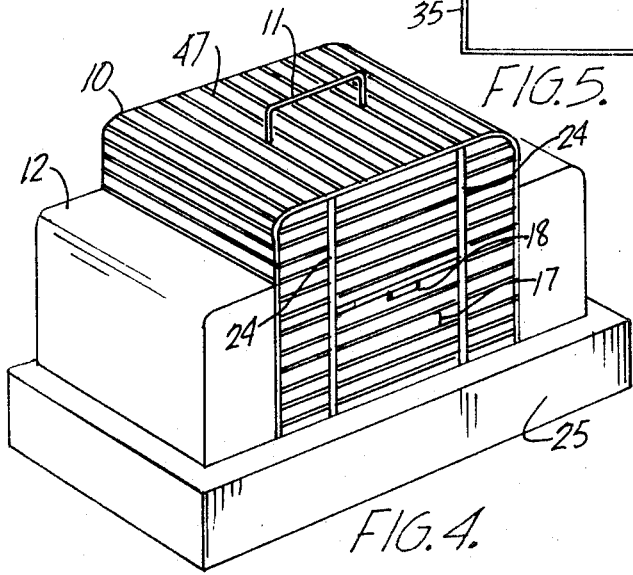
FIG. 4 is a perspective view of the cage.
Figure 2:
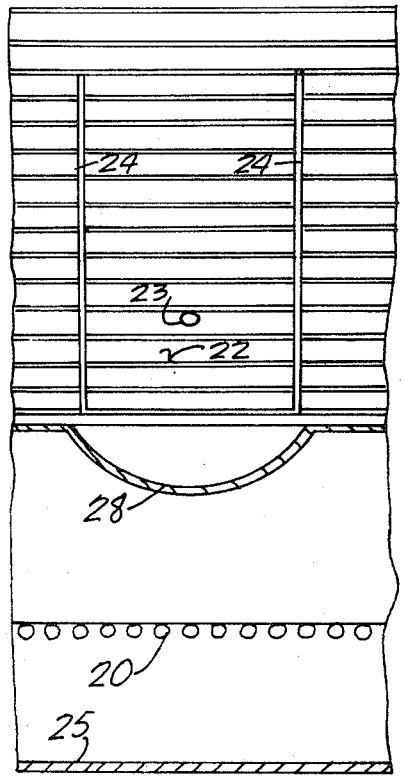
FIG. 2 is a sectional view of the cage taken along line 2—2 of FIG. 1.

The two feeders 30 are each of L-shaped cross-section as shown in FIG. 5, with the protruding lower section 35 partially fitting into the inside of the cage 40 through an opening in the cage. The feeder openings are of a size to admit the lower section 35 of the feeder. Clips 34 mounted to the face of the upper side 44 of the feeder permit the fastening of a feeder 30 externally to the side of the cage, when the lower section 35 of the feeder 30 is mounted through the cage opening. The top section 31 of the feeder is open at the top to permit food or water to be added from outside the cage, with the top plane 33 of the lower section 35 of the feeder being open to permit access to the food or water by the caged bird.

The sleeping compartment 12 and the bathing compartment 13 are formed of solid or translucent transparent external panels 15 and are each detachable mounted to opposing sides of the cage, each compartment being located adjacent an opening in the cage side grill, which opening may be closed by sliding door 22 mounted to the cage.

A sleeping platform 14 is located in the lower section of the sleeping compartment 12. Sleeping platform 14 is recessed in a curved concave shape to assist the bird to nestle in its accustomed manner, when sleeping.

A bathing platform 46 is located above the bottom section of the bathing compartment 13, with bathing platform 46 recessed in the concave shape of a portion of a sphere, so as to retain bath water and to permit the bird to readily enter or leave the bathing platform 46.

A handle 11 is fastened to the top 47 of the cage 10 for the purposes of hanging, or manually carrying the cage 10.

Main cage door 17 and side cage doors 22 are maintained in the closed position by gravity, with each door being slidable upwards in angle slides 24 to uncover the respective cage opening. Door 17 may be grasped by handle 18 and each of doors 22 may be grasped by a knob 23, with each of said doors being held in the open position by being cocked angularly against the fixed angle members 24, or by other fastening means.

In this description, directionally oriented terms such as "vertical," "horizontal," "up" and "down" relate to the positions when the cage is oriented in its normal position so as to rest on the bottom panel 25 of the base section, or to be hung from handle 11.

Since the material making up the sections of the cage are fabricated of plastic material, it is possible to form such members of material of varying transparency. In some instances, it may be desirable to utilize opaque plastic materials for the panel sections enclosing the sleeping compartment.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A multi-compartmented bird cage for the accomodation of a pet bird, said cage including a main compartment adjoining a bathing compartment and a sleeping compartment, with openings in said compartments to permit passage of the caged bird from the main compartment to the adjoining compartments, the main compartment being bottomed by a detachable base section, with an opening between the main compartment and the said base section being covered by a slidable grill, said slidable grill being mounted to the cage and fastened to, or removable from the said opening of the cage independently of the detachable base section, with both the bathing compartment and the sleeping compartment detachably mounted to the cage, with the lower section of the sleeping compartment fitted with a platform having an upper concave resting surface.

* * * * *